Patented Aug. 26, 1924.

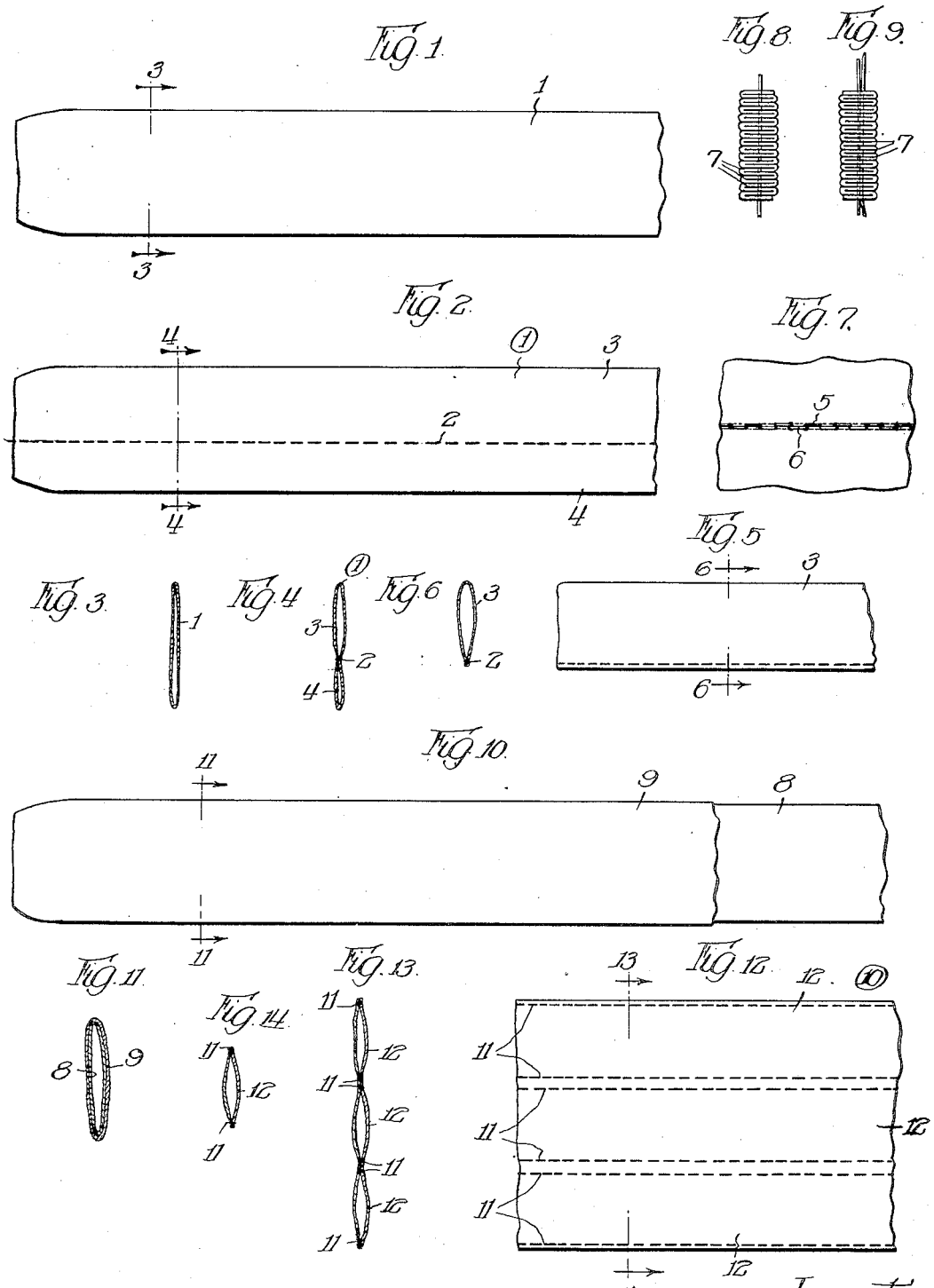

1,506,541

UNITED STATES PATENT OFFICE.

SOLOMON MAY, OF CHICAGO, ILLINOIS.

MANUFACTURE OF SAUSAGE CASINGS.

Application filed October 29, 1923. Serial No. 671,439.

*To all whom it may concern:*

Be it known that I, SOLOMON MAY, a citizen of the United States, residing at Chicago, in the county of Cook and State of Illinois, have invented certain new and useful Improvements in the Manufacture of Sausage Casings, of which the following is a specification.

The present invention relates to the manufacture of sausage casings.

More particularly the present invention relates to methods for making sausage casings of a predetermined size demanded by the trade. Sausage casings for certain purposes are of relatively uniform size being, when distended, about 1 inch to 1½ inches in diameter. For supplying the demand for such casings, wide or extra wide sheep casings are used, or narrow or extra narrow hog casings are used. The casings used for these purposes are the small intestines of these animals. Casings of this size sell at a relatively high price and are not sufficiently numerous to meet the demand.

An object of the present invention is to provide sausage casings of desired dimensions from intestines of larger dimensions, which intestines sell at a relatively low price.

A further object is to provide a method for expeditiously stitching relatively large casings whereby to prepare sausage casings of a size wanted by the trade.

A further object is to provide a sausage casing which is relatively cheap to manufacture and which meets the demands of commercial manufacture and the trade.

A further object is to provide a low priced sausage casing which will be free of inedible cords or strings.

Further objects will appear as the description proceeds.

According to the drawings—

Figure 1 is a view in side elevation of a gut or intestine, which may be a wide or extra wide hog gut or similar low-priced gut which has at present very little demand in the trade;

Figure 2 is a view of the gut shown in Figure 1 but provided with stitching means to provide a tubular member of desired diameter;

Figure 3 is a sectional view taken along the plane indicated by the line 3—3 of Figure 1;

Figure 4 is a sectional view taken along the plane indicated by the line 4—4 of Figure 2;

Figure 5 is a view similar to Figure 2, but showing part of the gut cut away leaving a single tubular casing;

Figure 6 is a sectional view taken along the plane indicated by the line 6—6 of Figure 5;

Figure 7 is a view, on an enlarged scale, showing a double stitch, which may be used in place of the stitch shown in Figure 2;

Figures 8 and 9 show intermediate steps in the process of stitching the casings shown in Figures 2 and 7;

Figure 10 represents a step in the process of making three sausage casings out of two guts;

Figure 11 is a sectional view taken along the plane indicated by the line 11—11 of Figure 10;

Figure 12 is a view of the two guts shown in Figures 9 and 10 after said guts have been slitted longitudinally and stitched together to form three tubular casings;

Figure 13 is a sectional view taken along the plane indicated by the line 13—13 of Figure 12; and Figure 14 is a view of a single casing formed by separating the plurality of casings illustrated in Figure 13.

The numeral 1 represents a wide or extra wide hog casing or similar low priced intestine which has at the present time very little demand in the trade and which sells at a low price. The large casing shown in Figure 1 is provided with one or more seams applied longitudinally thereof. Referring to Figure 2, a single longitudinal seam 2 is provided which divides the casing longitudinally into two chambers, indicated by numerals 3 and 4. Figure 4 shows in cross-sectional view the result of applying the longitudinal seam 2. After the seam 2 is applied, the casing 1 is severed along a line adjacent to the seam 2, leaving the casing illustrated in Figure 6, and indicated by the numeral 3. The seam 2 should preferably be made with gut string which expands and contracts with the casing and is edible just as the casing is.

In practice, it has been found advisable to make the seam 2 with a running stitch. Said seam may be a single stitch, as indicated by numeral 2 in Figures 2 and 4, or it may be a double stitch, as indicated by numerals 5 and 6 in Figure 7.

Figure 8 shows a practical method of applying the stitch 2. As shown in Figure 8, the casing 1 is folded upon itself in a series of tucks 7—7, said tucks being preferably of uniform size. After being tucked the casing may be pierced midway of the ends of said tucks, after which the gut string may be run through the holes provided by said piercing operation. When the casing has been flattened out again the stitch indicated in Figure 2 by the numeral 2 will be provided.

In the event that the double stitch illustrated in Figure 7 is desired, the casing will be tucked a second time but with the innermost part of the folds and the outermost parts of the folds transposed from their former positions. If the tucks as illustrated in Figure 8 have been pierced substantially midway of their width, the holes resulting from such piercing will substantially coincide when the tucks are transposed and a second string may be run through said holes. When the casing is again straightened out the double stitch illustrated in Figure 7 will be had.

In accordance with the invention as illustrated in Figures 1 to 6, a casing which meets the demand of the trade is provided, such a casing being had from a larger casing which sells at a much lower price. By reason of the fact that the stitch is made of gut string which expands and contracts in the same manner as the remainder of the casing, tearing is avoided during cooking and at other times, so that a serviceable and marketable casing is had. Furthermore, the use of the gut string has the advantage that it is edible just as is the remainder of the casing. It will be understood, of course, that the invention is not limited to the use of gut string, but that string, thread or cord of other material may be used if preferred.

Figures 10 to 14 illustrate the method by which three narrow casings may be made from two wide or extra wide casings.

Figures 10 and 11 are views in elevation and section respectively, showing two casings one mounted within the other, forming a double walled tube, the double walls being indicated in Figures 10 and 11 by the numerals 8 and 9. The tubular member referred to is then slitted longitudinally whereby to form a double-ply member having a width substantially equal to the circumference of said tubular member. As indicated in Figures 12 and 13, said double ply member, which is indicated as a whole by the numeral 10, may be provided with longitudinally extending seams to form a plurality of longitudinally extending receptacles. As shown in Figure 12, six single seams are illustrated, said seams being indicated by the numerals 11—11, which seams are spaced to provide the three receptacles 12—12—12. The three receptacles 12—12—12 may then be severed and each will sell at a considerably higher price than either of the two casings from which they are made.

The illustrated embodiments of the present invention have been chosen merely for the purpose of illustration and should not be considered in a limiting sense. Many modifications will occur to those skilled in the art. It is intended in this patent to cover all modifications that fall within the scope of the invention as defined by the appended claims.

What is claimed is:

1. The method of providing casings of predetermined cross-sectional dimensions consisting of providing a casing of larger cross-sectional dimension, stitching same longitudinally and severing the elongated receptacles provided by said stitching.

2. The method which consists in providing a casing of relatively large cross-sectional dimension, folding said casing in the form of tucks, piercing said tucks and inserting a string through the holes provided by said piercing operation.

3. The method which consists in providing a casing of relatively cross-sectional dimension, folding said casing in the form of tucks, piercing said tucks and inserting a gut string through the holes provided by said piercing operation.

4. The method which consists in providing an intestine of relatively large cross-sectional dimension, folding said intestine in tucks intermediate of its length, piercing said tucks substantially midway of their width, inserting a string in the holes provided by said piercing operation, folding said tucks reversely to bring said holes a second time into coincidence and inserting a second string through said holes close to said first string.

5. The method of providing a marketable casing from an excessively large casing which consists in stitching said large casing longitudinally and slitting said casing adjacent to said stitch to provide a casing of the desired cross-sectional dimension.

Signed at Chicago, Illinois, this 27th day of October, 1923.

SOLOMON MAY.